June 14, 1966  HANS-GEORG ZIMMERMANN ET AL  3,255,814
SCREW HEAT-EXCHANGER

Filed May 18, 1962                                    2 Sheets-Sheet 1

INVENTORS
HANS-GEORG ZIMMERMANN
RUDOLF SCHÄFER
BY
*James E. Bryan*
ATTORNEY

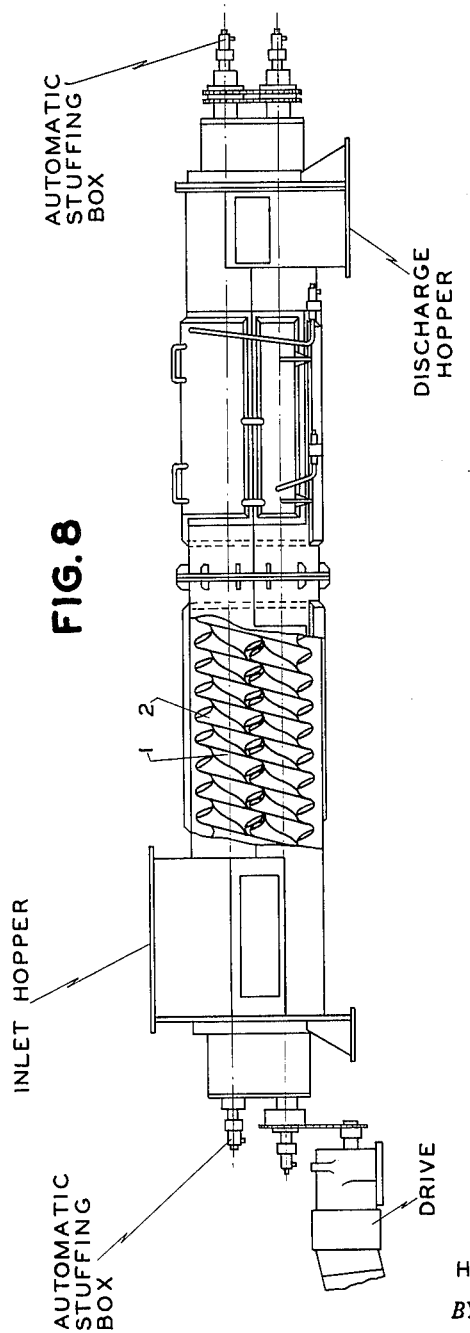

United States Patent Office 3,255,814
Patented June 14, 1966

3,255,814
SCREW HEAT-EXCHANGER
Hans-Georg Zimmermann, Wiesbaden-Biebrich, and Rudolf Schäfer, Coesfeld, Westphalia, Germany, assignors to Kalle Aktiengesellschaft, Wiesbaden-Biebrich, Germany, a corporation of Germany
Filed May 18, 1962, Ser. No. 195,794
Claims priority, application Germany, May 20, 1961, K 43,785
5 Claims. (Cl. 165—87)

This invention concerns a screw-type heat-exchanger.

It is known to use screw-type machines of welded construction for the continuous cooling or heating of products, particularly those of a granular, flaky or dough-like nature. These machines are constructed with one or more screws and are sometimes equipped with jacket heating or jacket cooling or with jacket heating and internal tube heating or cooling as the case may be or with heated or cooled hollow screw blades.

All the known screw-type heat exchangers of welded construction that are suitable for large throughputs have the disadvantage that they cannot be used for materials which tend to adhere to the screws. As a result of this adhesion, the known screw-type heat exchangers are liable according to their design to one or another of a series of defects, for example to a considerable reduction of heat transfer, clogging of the screws and therefore a reduction of their conveying capacity, or even a failure to convey the material at all, squeezing of the material, jamming of the screws in machines having several screws, resulting in an increase in the driving power required, or excessive drying of the product adhering to the screws, which, when the material becomes detached at intervals, has the effect of impairing the quality of the bulk of the product which normally passes through.

One object of the invention is to produce a screw-type heat exchanger having at least two intermeshing screws with hollow threads chargeable with cooling or heating media and preferably made from drawn sheet metal, whereby even dough-like material or material which tends to adhere, either at normal temperatures or when it is cooled or heated, can be cooled or heated without the above-mentioned disadvantages occurring.

This result is obtained according to the invention by a construction in which, in a screw-type heat exchanger, at least two screws are connected for rotation in the same direction and the threads are hollow, can be charged with a heating or cooling medium and intermesh in such a manner that the outer tip of each thread touches or nearly touches over the entire intermeshing portions the threads of adjacent screws.

Figure 1:
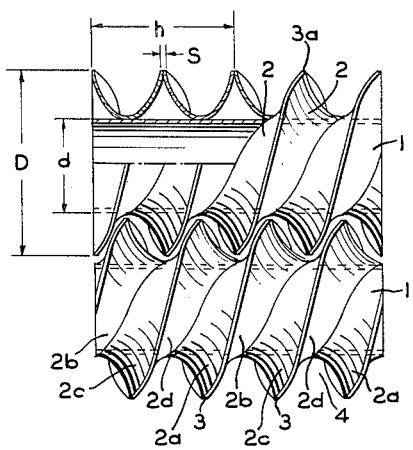
Figure 2:
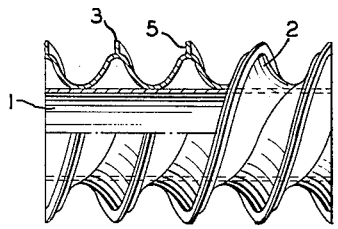
Figure 3:
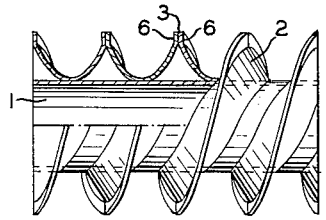
Figure 4:
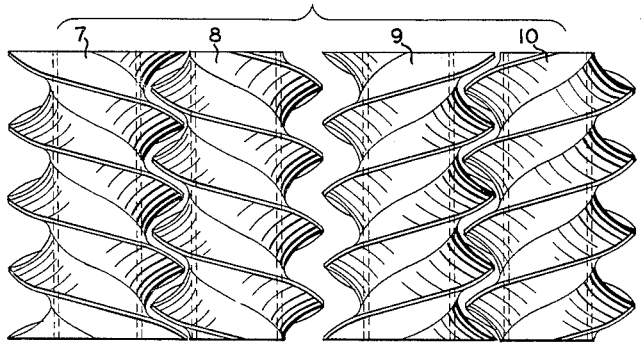
Figure 7:
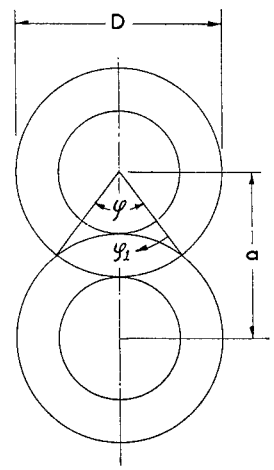
Figure 5:
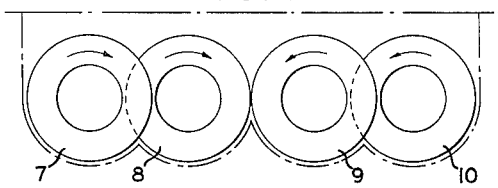
Figure 6:
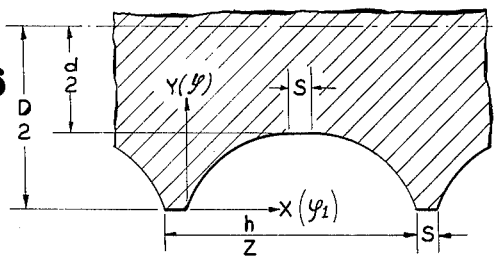

The invention is further illustrated in the accompanying drawings, in which:

FIGURE 1 is a view in elevation of one embodiment of the screws of a heat exchanger according to the invention having two shafts, FIGURES 2 and 3 are views in elevation of other embodiments of individual screws, FIGURES 4 and 5 are a view in elevation and an end view respectively of an arrangement of four screws according to the invention, FIGURES 6 and 7 illustrate certain of the mathematical relationships used in the description, FIGURE 6 showing the shape of a cutting line which results when the flanks of a thread are cut by a plane passing through the longitudinal axis of a screw, and FIGURE 7 schematically illustrates in an end view the intermeshing of two screw flights, FIGURE 8 is a view in elevation of one embodiment of a heat-exchanger according to the invention showing two screw flights mounted in a casing, the casing being partially broken away.

Referring to the drawings, in the screw-type heat exchangers illustrated, each screw consists of a screw core or shank 1 having a diameter $d$ and two thread plates, or rib parts, welded thereon in the form of a helix. In each case the two parts of the rib, for example 2a and 2b, and 2c and 2d, are joined together, preferably welded, at the rib or blade tip 3 and thereby enclose between themselves and the screw core or shank 1 a cavity having a spiral course, which can be charged with a cooling or heating agent. The two rib parts, which are joined to each other and to the screw core or shank 1 in this manner, are here referred to collectively as a rib or thread and the external surfaces of a rib or thread as the flanks 2. Where more than one thread is on a single flight, such a screw is termed a multiple thread flight.

In the screw-type heat exchangers according to the invention, appropriate profiling of the hollow ribs, which depends on the number of threads and the shape of the rib tip, ensures that the meshing tip of each thread touches or nearly touches the flanks of an adjacent flight over the entire range of overlapping. As a result of the fact that two adjacent flights rotate in the same direction, their directions of movement at all points of contact, i.e. along the entire line of contact, are opposed to each other, so that the tip of one rib exerts a scraping effect on the meeting flanks of the rib of an adjacent screw and thus keeps it clean. For example, the tip 3a keeps the flanks of the rib portions 2a and 2d clean. This process is mutual, so that two adjacent screws clean one another.

The shape of the threads of intermeshing screws according to the invention follows a geometrical rule which is represented by the following mathematical formulae:

$$y(\alpha_1) = \frac{D}{2} - \sqrt{\frac{D^2}{4} + a^2 - a \cdot D \cdot \cos\left(\frac{90}{z} - \frac{180 \cdot s}{h} - \alpha_1\right)}$$

and $$x(\alpha_1) = \frac{h}{360} \cdot \alpha_1 + \frac{h}{360}\left(\frac{90}{z} - \frac{180 \cdot s}{h}\right) - \text{arc tg} \frac{\frac{D}{2} \sin\left(\frac{90}{z} - \frac{180 \cdot s}{h} \cdot \alpha_1\right)}{a - \frac{D}{2} \cos\left(\frac{90}{z} - \frac{180 \cdot s}{h} - \alpha_1\right)}$$

These formulae define in coordinates $y(\alpha_1)$ and $x(\alpha_1)$ the shape of the cutting line which results when the flanks of the thread are cut in a plane which longitudinally goes through the center of the screw. An example of such a cutting line is shown in FIGURE 6.

In the formulae the symbols mean the following:

$D$—external diameter of the screw
$a$—distance between the axes of the two intermeshing screws
$h$—lead of the threads of the screws
$s$—axial extension of the tips of the screws
$z$—number of threads
$\alpha_1$ is an angle having any value between 0 and $\alpha/2$ where $\alpha$ is the angle having its point in the center of the screw, and the sides of which angle $\alpha$ go through the two points of intersection of the peripheries of the intermeshing screws, as shown in FIGURE 7.

In the example illustrated diagrammatically in FIGURE 1, which is a multiple screw heat exchanger as referred to above having two threads, of the same hand and pitch, and thus the lead $h$ is twice the pitch, the stripping curve is determined by the screw line on the outside diameter $D$ of the screw. The tolerance between interfolded flights depends substantially on the maintenance of a uniform pitch over the entire length of the interfolded flights.

In the manufacture of the screws it may be difficult to avoid distorting the threads when welding, depending on the nature of the material used therefor. The manufacturing process may be simplified in those cases in which such distortion is likely to occur by deviating somewhat from the calculated theoretical form of the flanks of the threads, by forming the peripheral portions of the flanks to follow a radial direction. This may be effected, for example, by forming the tip 3 of the rib from a strip 5 mounted on the meeting edges of the flanks 2, as shown in FIGURE 2.

A similar effect may be produced in practice by welding the two flanks of the rib together over an area 6 at the periphery of the rib, as shown in FIGURE 3. In these embodiments, which deviate somewhat from the calculated theoretical thread form by having peripheral portions directed radially outwards, any distortions that may occur can be readily compensated for by machining these peripheral portions to a uniform diameter, without any weakening of the blades.

A particularly satisfactory mixing and heat exchange effect on the material to be treated is obtained with heat exchangers according to the invention which comprise two or more pairs of intermeshing screws or flights, each adjacent pair of which is connected to rotate in the same direction, as specified above, and in an opposite direction as compared with the screws of any adjacent pair. FIGURES 4 and 5 show an arrangement of screws in such an exchanger having two pairs of intermeshing screws. In this exchanger, the two screws 7 and 8 of the four screws 7, 8, 9 and 10 form a pair of mutually self-cleaning screws and the two screws 9 and 10 form a second such pair. The four screws are connected in a known manner, not illustrated in the drawings, so that the screws 7 and 8 rotate in a clockwise direction, while the screws 9 and 10 rotate in a counter-clockwise direction or vice versa.

FIGURES 1 and 4 show the intermeshing screws with a clearance between them. It must be understood that this showing is merely a means for more clearly demonstrating in these figures the curvature of the intermeshing parts. In practice substantially no clearance is to be found between the intermeshing threads.

It will be obvious to those skilled in the art that many modifications may be made within the scope of the present invention without departing from the spirit thereof, and the invention includes all such modifications.

What is claimed is:

1. A screw-type heat exchanger comprising a casing having at least two interfolded hollow screw flights mounted therein for rotation in the same direction in a manner such that the tip of the thread of each flight passes in close proximity to both flanks of the thread of an adjacent flight over the entire interfolded zone of the flights whereby a scraping effect is provided, means for rotating the screw flights in the same direction, and means for passing a heat transfer medium through the flights.

2. A screw-type heat exchanger according to claim 1 in which the periphery of the flights is formed by metal strips secured to the tips of the threads.

3. A screw-type heat exchanger according to claim 1 in which the threads are formed from separate plates joined at the periphery thereof over an area sufficient to permit machining to a uniform diameter.

4. A screw-type heat exchanger according to claim 1 including at least two pairs of interfolded flights, the flights of each pair being rotatable in the same direction and in a direction opposite to that of the other pair.

5. A screw-type heat exchanger according to claim 1 in which each flight has multiple threads.

References Cited by the Examiner
UNITED STATES PATENTS

| | | | |
|---|---|---|---|
| 1,987,952 | 1/1935 | Wilson | 165—87 X |
| 2,731,241 | 1/1956 | Christian | 165—87 |
| 2,788,960 | 4/1957 | Skinner et al. | 165—87 |

ROBERT A. O'LEARY, *Primary Examiner.*

CHARLES SUKALO, *Examiner.*

M. A. ANTONAKAS, *Assistant Examiner.*